United States Patent [19]

Lim

[11] Patent Number: 5,683,158
[45] Date of Patent: Nov. 4, 1997

[54] CASING STRUCTURE FOR USE IN A VIDEO CASSETTE RECORDER

[75] Inventor: Kwoang-Soo Lim, Seoul, Rep. of Korea

[73] Assignee: Daewoo Electronics, Co., Ltd., Seoul, Rep. of Korea

[21] Appl. No.: 611,981

[22] Filed: Mar. 5, 1996

[30] Foreign Application Priority Data

Mar. 31, 1995 [KR] Rep. of Korea ............... 95-6259

[51] Int. Cl.$^6$ ............................................. A47B 49/00
[52] U.S. Cl. .................... 312/326; 292/80; 292/162; 312/204; 312/7.2; 312/324
[58] Field of Search .................... 360/94, 96.5, 96.6; 312/204, 328, 223.1, 7.1, 7.2, 326, 324; 49/394; 292/95, 80, 162

[56] References Cited

U.S. PATENT DOCUMENTS

| | | | |
|---|---|---|---|
| 3,110,533 | 11/1963 | Le Bron | 312/7.2 X |
| 3,301,952 | 1/1967 | Reznik | 312/7.2 X |
| 4,252,387 | 2/1981 | Wagner | 312/204 |
| 4,589,709 | 5/1986 | Bond et al. | 109/68 X |
| 4,896,070 | 1/1990 | Reid et al. | 312/7.1 X |
| 4,938,513 | 7/1990 | Gunderson | 292/80 |
| 5,255,965 | 10/1993 | Chen et al. | 312/7.1 |
| 5,433,517 | 7/1995 | Fleisch | 312/334.8 |

*Primary Examiner*—Peter M. Cuomo
*Assistant Examiner*—Stephen Vu
*Attorney, Agent, or Firm*—Pennie and Edmonds, LLP

[57] ABSTRACT

A video cassette recorder casing includes a panel provided with one or more fitting holes, a front door provided with a same number of supporting bosses at its lower part as that of the fitting holes, each of the bosses having an inserting hole, and a same number of detachable clasps as that of the fitting holes. Each of the clasps is divided into a head, a body and a tail portions, the head portion being M-shaped, the tail portion provided with a pair of pins, one end of each of the pins fixed to the tail portion and the other end thereof being free in such a way that the pair of pins are inserted into one of the inserting holes of the supporting bosses. The front door is attached to the panel by fitting each of the clasps into each of its corresponding fitting holes of the panel.

9 Claims, 6 Drawing Sheets

CASING STRUCTURE FOR USE IN A VIDEO CASSETTE RECORDER

FIELD OF THE INVENTION

The present invention relates to a video cassette recorder (VCR); and, more particularly, to a VCR casing having a detachable clasp capable of attaching a front door to a panel thereof.

BACKGROUND OF THE INVENTION

In FIGS. 1 and 2, there are shown a perspective view of a conventional VCR casing 1 equipped with a front panel 10 and a front door 20 and a sectional side view of the front panel 10 and the front door 20, respectively.

As shown in FIG. 2, the front door 20 is provided with a hook 21 at a top center thereof and a pair of fasteners 22, each of the fasteners 22 being positioned at a lower right and a lower left corners of the front door 20. The front panel 10 is provided with a catcher 11 for accommodating the hook 21 of the front door 20 and a pair of bosses 12, each of the bosses 12 being fitted into each of the fasteners 22 of the front door 20 in such a way that the front door 20 is allowed to rotate about the bosses 12 of the front panel 10.

When a user pushes the top center part of the front door 20 to open or close the latter, the hook 21 is freed from or accommodated into the catcher 11 of the front panel 10, making the front door 20 open or close.

While opening the front door, however, an excessive force may be applied thereto inadvertently, damaging the fasteners of the front door and/or the bosses of the panel.

SUMMARY OF THE INVENTION

It is, therefore, a primary object of the invention to provide a VCR casing provided with a front door on a front panel having a reduced likelihood of malfunctioning when an excessive force is applied on the front door during an opening thereof.

In accordance with one aspect of the present invention, there is provided a casing for a VCR comprising: a front panel provided with one or more fitting holes; a front door provided with a same number of supporting bosses at its lower part as that of the fitting holes; each of the bosses having an inserting hole, and a same number of detachable clasps as that of the fitting holes, each of the clasps divided into three portions, a head, a body and a tail portions, the head portion being M-shaped, the tail portion being provided with a pair of pins, one end of each of the pins fixed to the tail portion and the other end thereof being free in such a way that the pair of pins are inserted into one of the inserting holes of the supporting bosses, wherein the front door is attached to the front panel by fitting each of the clasps into each of its corresponding fitting holes of the front panel.

BRIEF DESCRIPTION OF THE DRAWINGS

The above and other objects and features of the present invention will become apparent from the following description of preferred embodiments, when taken in conjunction with the accompanying drawings, in which.

DETAILED DESCRIPTION OF THE PREFERRED EMBODIMENTS

Figure 1:
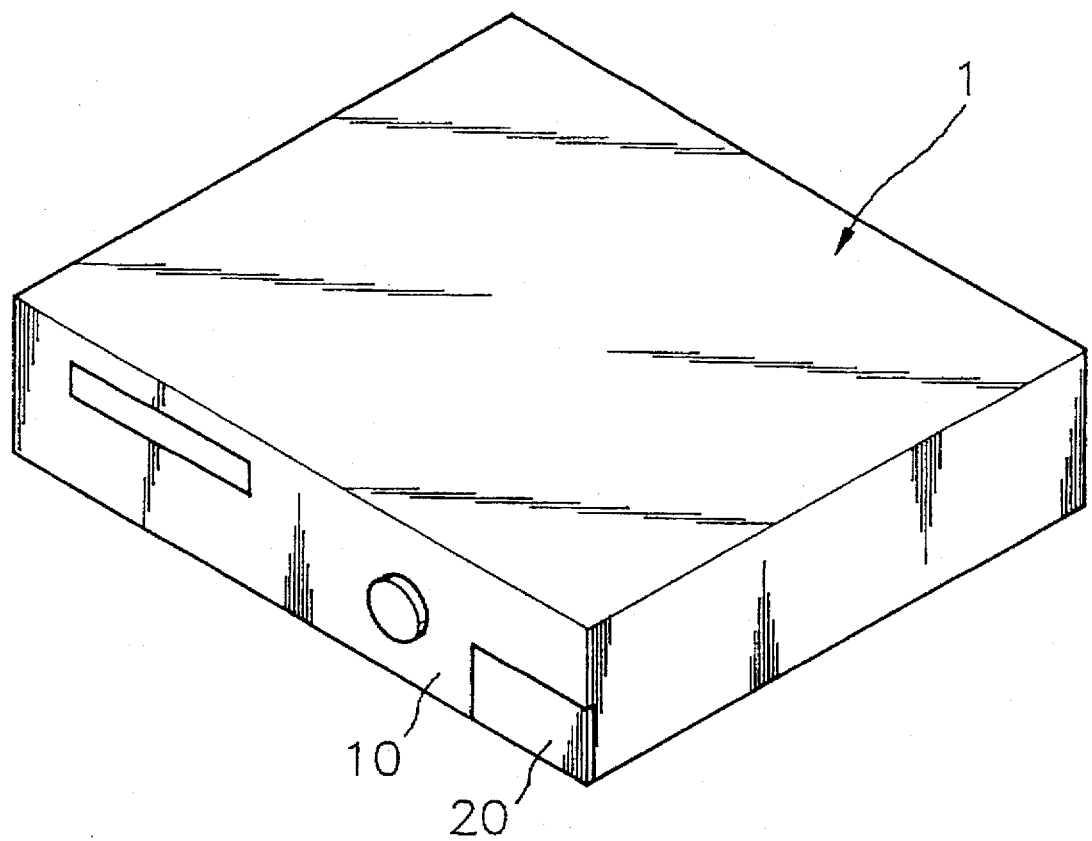
FIG. 1 shows a perspective view of a conventional VCR showing the front panel and the front door thereof.
Figure 2:
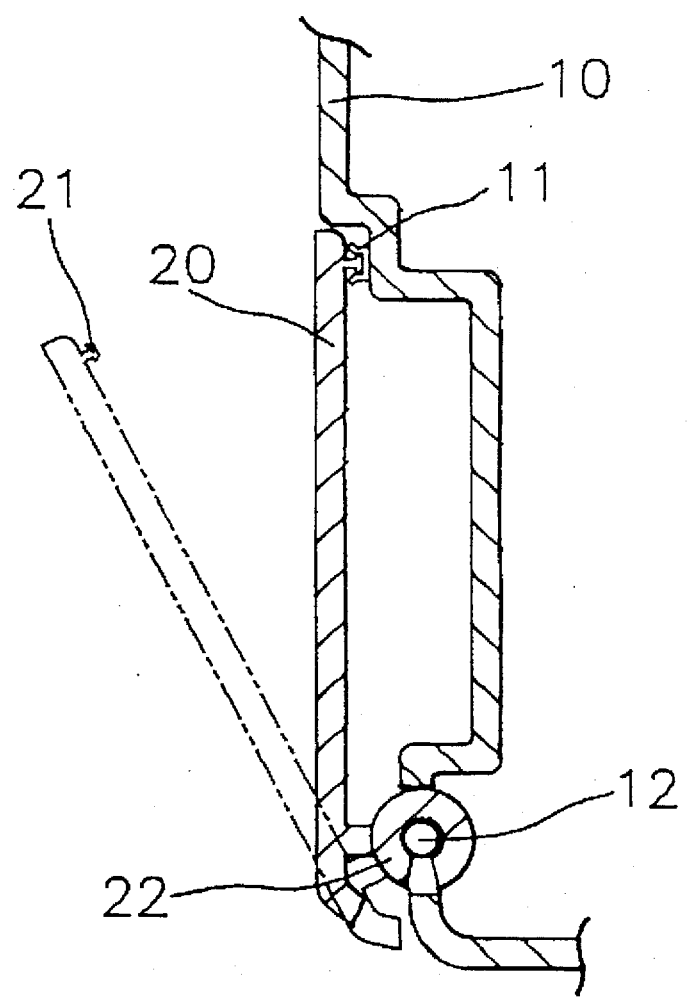
FIG. 2 represents a sectional side view of the front door and the front panel.
Figure 3:
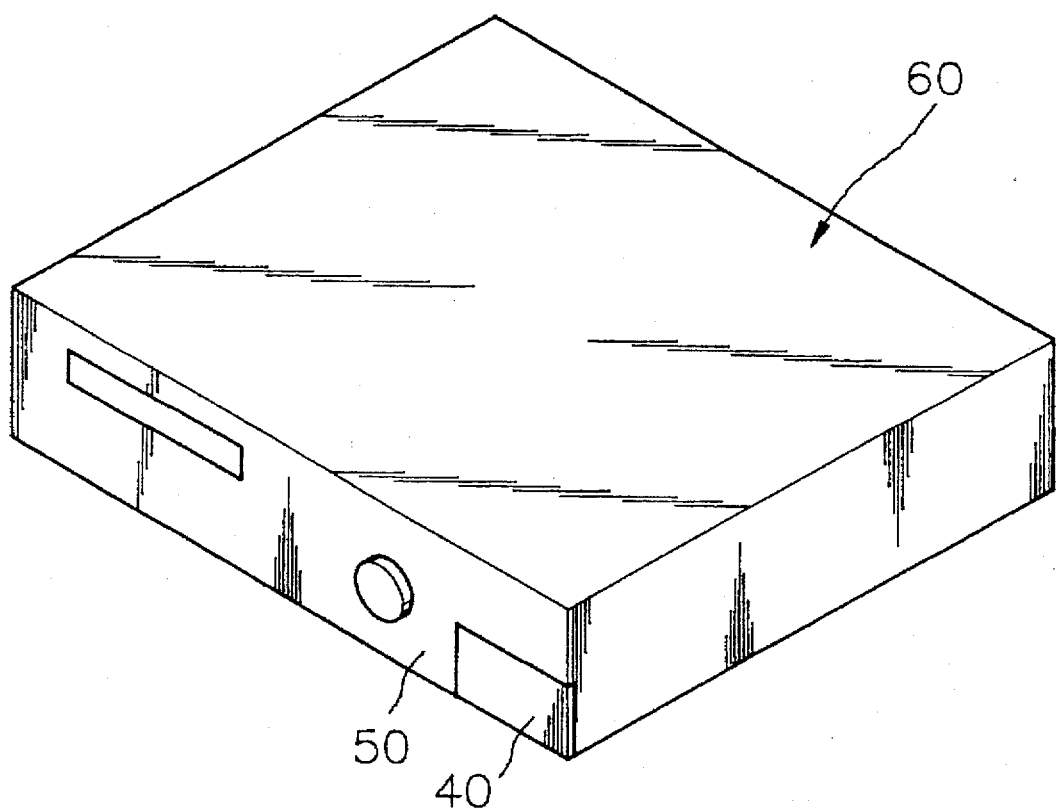
FIG. 3 illustrates a perspective view of the VCR casing in accordance with the present invention.
Figure 4:
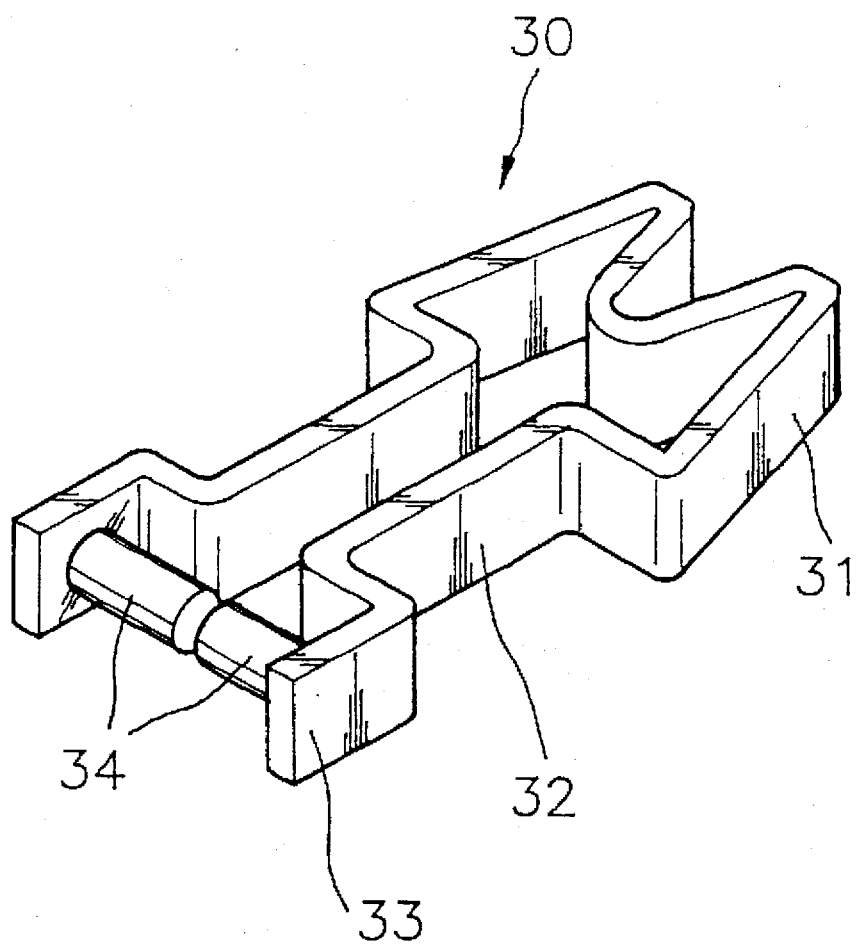
FIG. 4 offers perspective view of an inventive clasp.

In FIG. 3, there is shown a VCR casing 60, the casing 60 being provided with a front panel 50 and a front door 40; and in FIG. 4, there is shown a perspective view of a detachable clasp 30 provided therein.

As shown in FIG. 4, the detachable clasp 30 is divided into three portions, a head, a body and a tail portions 31, 32, 33, the head portion 31 being M-shaped to allow an easy insertion and the tail portion 33 being provided with a pair of pins 34, wherein one end of each of the pins 34 is fixed to the tail portion 33 and the other end thereof is free. The detachable clasp 30 is made of an elastic material such as a synthetic resin.

Figure 5:
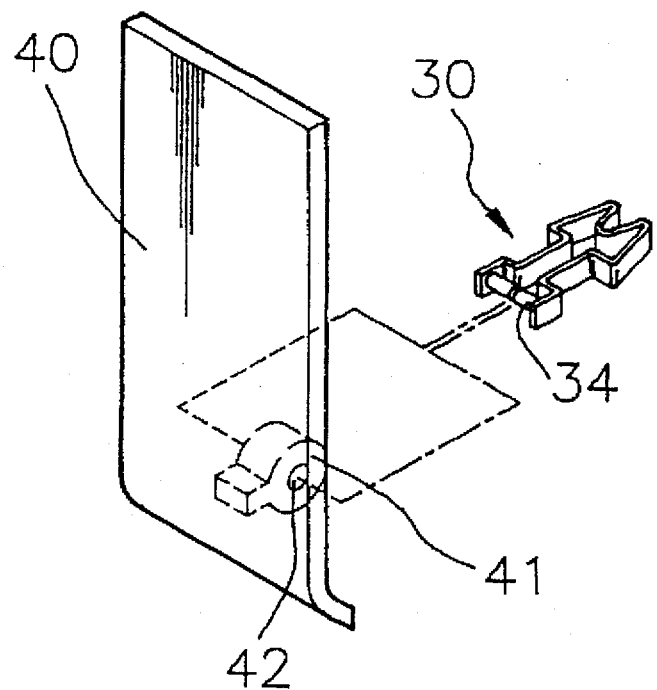
FIG. 5 depicts a process for attaching the clasp to the front door.

In FIG. 5, there is shown a process for attaching the clasp 30 to a front door 40. The front door 40 is provided with a supporting boss 41 having an inserting hole 42 at a bottom center thereof. The front door 40 may be provided with a pair of supporting bosses, wherein each of the supporting bosses has an inserting hole and is positioned at a lower right and a lower left corners of the front door 40. The front door 40 is further provided with a hook 43 at a top center thereof.

The tail portion 33 of the clasp 30 is elastically opened in such a way that each of the pins 34 provided at the tail portion 33 is allowed to be inserted into the inserting hole 42 of the boss 41 provided at the front door 40, thereby attaching the clasp 30 to the front door 40.

Figure 6:
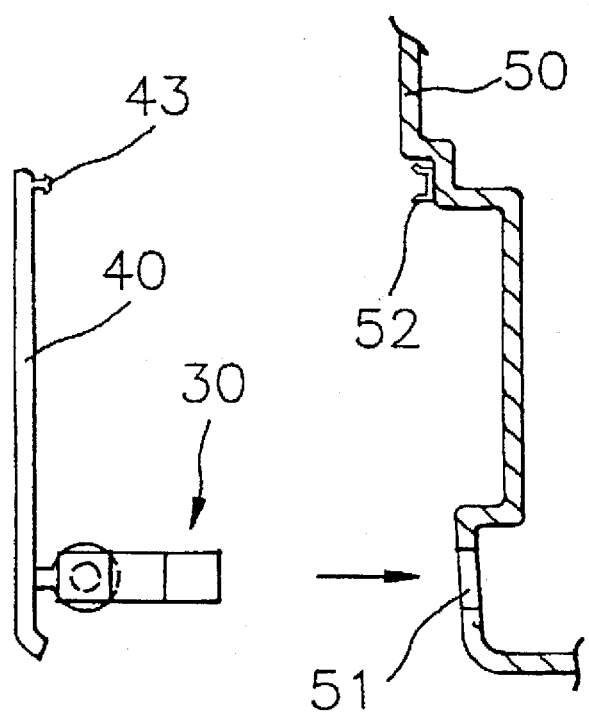
FIG. 6 displays a process for attaching the front door to the front panel of the VCR.

On the other hand, as shown in FIG. 6, the front panel 50 is provided with a catcher 52 for accommodating the hook 43 of the front door 40 and a fitting hole 51 for accommodating the head portion 31 of the clasp 30.

The front door 40 is attached to the front panel 50 by fitting the clasp 30 into the fitting hole 51 provided at the front panel 50. Thus, the front door 40 is capable of rotating about the pair of the pins 34 of the clasp 30.

When a user pushes the top center part of the front door 40 to open or close the door, the hook 43 is freed from or accommodated into the catcher 52 of the front panel 50, thereby opening or closing the front door 40.

In such a front door equipped with the clasp, it is not only easy to assemble or attach the front door to the front panel, but also easy to replace the clasp, should it be damaged.

Although the invention has been shown and described with respect to the preferred embodiments, it will be understood by those skilled in the art that various changes and modifications may be made without departing from the scope of the invention as defined in the following claims.

What is claimed is:

1. A casing structure for use in a video cassette recorder comprising:

a front panel provided with one or more fitting holes;

a front door provided with an equal number of supporting bosses at its lower part as that of the fitting holes, each of the bosses having an inserting hole; and an equal number of detachable clasps as that of the fitting holes, each of the clasps divided into a head, a body and a tail portions, the head portion being M-shaped, the tail portion being provided with a pair of pins, one end of each of the pins fixed to the tail portion and the other end thereof being free in such a way that the pair of pins are inserted into one of the inserting holes of the supporting bosses, wherein the front door is attached to the front panel by fitting each of the clasps into a corresponding one of said fitting holes of the front panel.

2. The casing structure of claim 1, wherein the front door is equipped with a hook at a top center thereof and the panel is equipped with a catcher for accommodating the hook.

3. The casing structure of claim 1, wherein the clasp is made of an elastic material.

4. The casing structure of claim 3, wherein the elastic material is a synthetic resin.

5. A casing structure comprising:

a front panel having at least one fitting hole;

a front door having at least one supporting boss at its lower part, said boss having an inserting hole; and at least one clasp having a head end and a tail end, the head portion having a lateral portion extending beyond the rest of the clasp, the tail portion having a pair of pins, each of the pins having a free end, wherein the front door is detachably connected to the clasp by engaging the free ends of the pair of pins with the inserting hole on the supporting bosses, and wherein the front door is further attached to the front panel by fitting the head portion of the clasp into the fitting hole on the front panel.

6. The casing structure of claim 5, wherein the front door has a hook at a top center thereof and the panel has a catcher for accommodating the hook.

7. The casing structure of claim 5, wherein the head portion of the clasp is M-shaped.

8. The casing structure of claim 5, wherein the clasp is made of an elastic material.

9. The casing structure of claim 8, wherein the elastic material is a synthetic resin.

* * * * *